United States Patent
Chatterjee et al.

(10) Patent No.: US 11,556,365 B2
(45) Date of Patent: Jan. 17, 2023

(54) OBSCURING INFORMATION IN VIRTUALIZATION ENVIRONMENT

(71) Applicant: International Business Machines Corporation, Armonk, NY (US)

(72) Inventors: Debapriya Chatterjee, Austin, TX (US); Bryant Cockcroft, Austin, TX (US); John A. Schumann, Austin, TX (US); Karen Yokum, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 521 days.

(21) Appl. No.: 16/580,067

(22) Filed: Sep. 24, 2019

(65) Prior Publication Data

US 2021/0089340 A1 Mar. 25, 2021

(51) Int. Cl.
*G06F 9/455* (2018.01)
*H04L 9/08* (2006.01)

(52) U.S. Cl.
CPC ........ *G06F 9/45558* (2013.01); *H04L 9/0869* (2013.01); *G06F 2009/45583* (2013.01)

(58) Field of Classification Search
None
See application file for complete search history.

(56) References Cited

U.S. PATENT DOCUMENTS

| | | | |
|---|---|---|---|
| 5,636,373 A | 6/1997 | Glendening et al. | |
| 7,085,948 B2 | 8/2006 | Anderson et al. | |
| 7,870,411 B2 | 1/2011 | Fraser et al. | |
| 8,453,151 B2 | 5/2013 | Manczak et al. | |
| 9,864,708 B2 | 1/2018 | Warkentin et al. | |
| 10,049,211 B1* | 8/2018 | Lukacs | G06F 21/554 |
| 2013/0212160 A1* | 8/2013 | Lawson | G06F 16/9535 709/203 |
| 2015/0317495 A1 | 11/2015 | Rodgers et al. | |
| 2016/0314299 A1* | 10/2016 | Almer | H04W 12/37 |
| 2017/0220369 A1* | 8/2017 | Kaplan | G06F 9/45558 |

(Continued)

FOREIGN PATENT DOCUMENTS

| CN | 103138939 A | 5/2013 |
|---|---|---|
| CN | 110058921 A | 7/2019 |

OTHER PUBLICATIONS

"Secure Encrypted Virtualization API Version 0.22", Advanced Micro Devices (Year: 2019).*

(Continued)

*Primary Examiner* — Wynuel S Aquino
(74) *Attorney, Agent, or Firm* — Kelsey M. Skodje (57) ABSTRACT

A hardware request of an application is detected. The Application executes on a virtualized computer system. It is determined that the hardware request includes a counter. The counter is to be performed by the virtualized computer system. The counter includes a counter value. The hardware request is intercepted before the it is processed by a hypervisor that hosts the virtualized computer system. The interception is based on the determining the hardware request includes the counter. The counter value is saved in a secure memory. The secure memory is obscured from the hypervisor. A scrambled counter value is generated. The hardware request is updated with the scrambled counter value. After the hardware request is updated it is provided to the hypervisor.

20 Claims, 5 Drawing Sheets

(56) References Cited

U.S. PATENT DOCUMENTS

| | | | |
|---|---|---|---|
| 2018/0011733 A1* | 1/2018 | Tsirkin | G06F 9/45533 |
| 2018/0165224 A1* | 6/2018 | Brown | G06F 21/53 |
| 2018/0189484 A1* | 7/2018 | Danahy | G06F 21/577 |
| 2019/0034627 A1 | 1/2019 | Hall et al. | |
| 2019/0034666 A1 | 1/2019 | Boivie et al. | |
| 2019/0278918 A1 | 9/2019 | Boivie et al. | |
| 2021/0281408 A1* | 9/2021 | Liu | H04L 63/04 |

OTHER PUBLICATIONS

Yuming Wu, "Comprehensive VM Protection against Untrusted Hypervisor through Retrofitted AMD Memory Encryption", IEEE (Year: 2018).*

"Exploiting Unprotected I/O Operations in AMD's Secure Encrypted Virtualization" (Year: 2019).*

PCT/IB2020/058838 International Search Report and The Written Opinion, dated Jan. 15, 2021, 11 pages.

Liu et al., "CPU Transparent Protection of OS Kernel and Hypervisor Integrity with Programmable DRAM," ISCA '13 Proceedings of the 40th Annual International Symposium on Computer Architecture, Jun. 2013, pp. 392-403, ACM.

Mccoyd et al., "Building a Hypervisory on a Formally Verifiable Protection Layer," 2013 46th Hawaii International Conference on System Sciences, 2013, pp. 5069-5078, IEEE.

Mell et al., "The NIST Definition of Cloud Computing: Recommendations of the National Institute of Standards and Technology," Special Publication 800-145, Sep. 2011, 7 pages, National Institute of Standards and Technology, Gaithersburg, MD.

* cited by examiner

OBSCURING INFORMATION IN VIRTUALIZATION ENVIRONMENT

BACKGROUND

The present disclosure relates to hypervisor operation, and more specifically, to obscuring time-base information from a hypervisor in a multi-tenant server.

Applications and operating systems may operate on a computer system. The computer system may be a memory, processor, and input output interface (I/O). The computer system may be a virtual computer system operated by a hypervisor. Some clients may prefer the flexibility of a virtual computer system. These clients may also prefer more security over information while operating on a virtual computer system.

SUMMARY

According to some embodiments, disclosed is a system, method and computer program product. A hardware request of an application is detected. The Application executes on a virtualized computer system. It is determined that the hardware request includes a counter. The counter is to be performed by the virtualized computer system. The counter includes a counter value. The hardware request is intercepted before the it is processed by a hypervisor that hosts the virtualized computer system. The interception is based on the determining that the hardware request includes the counter. The counter value is saved in a secure memory. The secure memory is obscured from the hypervisor. A scrambled counter value is generated. The hardware request is updated with the scrambled counter value. After the hardware request is updated, it is provided to the hypervisor.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to hypervisor operation; more particular aspects relate to obscuring time-base information from hypervisor in a multi-tenant server. While the present disclosure is not necessarily limited to such applications, various aspects of the disclosure may be appreciated through a discussion of various examples using this context.

In an application and operating system (OS) hosting environment, OS instances provided by a provider may run on a hypervisor maintained by the provider. For example, in a cloud environment, OS instances can run as guest machines on a hypervisor maintained by the cloud provider, with the OS instances running as separate partitions on the same physical system. In some situations, a hypervisor is entitled to access any partition's data. Access of any partition by a hypervisor may create a security risk, as a provider could access any information from the OS (and applications running inside the OS) including sensitive data of users. This issue may be compounded as cloud providers may guarantee data privacy or regulations may dictate the protection of sensitive data.

One class of solutions involve introducing a privilege level above the hypervisor (e.g., the privilege level above the hypervisor is a privilege level that is considered trusted) which may intercept any exceptions from the partitions considered secure going to the hypervisor. For example, an ultravisor may have an elevated privilege level in comparison to a hypervisor.

An elevated privilege handler for exceptions (e.g., at a level above the hypervisor) may obscure the values of hardware registers accessible to the hypervisor. For example, values in various hardware registers store information from user programs or OS ("applications"). These values and hardware registers that correspond to applications operating on a virtual machine provided by a hypervisor may be inspected and viewed by the hypervisor. Providing an elevated level of privilege above the hypervisor may allow for various values and hardware registers that correspond to applications to be viewed as encrypted from the point of view of the hypervisor.

In another example, a save operation or a restore operation ("memory operation") to some portion of memory (e.g., virtual memory provided to the applications by a hypervisor) and the hypervisor may be able to access the same portions of virtual memory. By not allowing a hypervisor access to a portion of memory, certain memory operations may be prevented. A portion of virtual memory not accessible by a hypervisor may be a secure memory. The hypervisor in these examples may be provided only the exact amount of information necessary to perform the various operations and may not be provided access to the secure memory.

There are issues with elevated privilege levels such as those used by ultravisors. Many modern computer architectures operate on techniques called multiprocessing. Multiprocessing may allow a user program or an OS to handle multiple processes or threads at the same time. Multiprocessing may allow these applications to perform with increased efficiency or with higher processing throughput. Multiprocessing may rely on very specific hardware requests. For example, applications may send hardware requests to various registers of a processor to perform a multithreading operation. These various registers may be special purpose registers such as counters, decrementers, or incrementers.

A counter (a register that counts down with processor clock and generates a timer interrupt when it crosses zero) may be an essential register to a user program or an OS, as it is the source of timer interrupts. A counter may be a fundamental hardware mechanism for pre-emptive process scheduling deployed in many modern operating systems. The counter may be hypervisor accessible in certain cases (e.g., due to legacy reasons). With the introduction of an ultravisor, the counter may also be obscured from the hypervisor; obscuring a counter may be beneficial to try and prevent the hypervisor from being otherwise exploited for performing timing attacks by the hypervisor.

If various special purpose registers such as the counter are obscured from the hypervisor, an unintended consequence is that the applications running in the virtual machine may run with worse performance. For example, certain counters and other special purpose registers are used to accurately share processing resources and to perform context switches between various components. A scheduler, a context switcher, a stack pointer, a program counter, or other relevant processing hardware register may rely on accurate counter values from the processors (and in the case of virtual machines, the hypervisor). During the operations of some ultravisors and other elevated privilege operations, obscured counters are provided to and received from the hypervisor. The ultravisor records the original values, stores the values in some secure region of memory inaccessible to the hypervisor, and restores the values before going back into the guest virtual machine or process. This method may be sufficient for registers that do not decrement or increment with processor clocks or are not a function of a processor clock (i.e., registers not intended for time measurement in any way), but for the registers that are indeed related with the processor clock, this method leads to the restored value from secure memory being incorrect.

When a guest virtual machine or application operates based on obscured values, processes and threads may be given more or less computer resources to perform operations than they require. For example, inaccurate time slicing of multiple parallel executions of program code (e.g., threads, processes) may prevent certain program code from finishing in time. If a certain portion of program code does not finish before being interrupted, it may be requeued, become stalled, or even crash. With an inaccurate counter a portion of program code may be finished without an interrupt corresponding to the program finishing. A lagging interrupt coming after actual finishing of program code execution may consequently cause a processor to sit idle for many cycles. Further, programs that do not finish and are requeued may lead to repeated switches between processes/threads to reperform the work that was finished and interrupted, causing wasted cycles or program slowdowns. Further, the act of stopping executing of a first segment of program code and starting execution of a second program code may have overhead in processing, memory, or I/O of the computer.

A counter aware ultravisor (CAUV) may overcome the issues of other ultravisors by providing obscured or scrambled counters to a hypervisor while translating and returning counters to applications that provide relevant values for performing multiprocessing. A CAUV may provide a placeholder value to a hypervisor that may obscure information from the hypervisor. The CAUV may also measure the time spent in the hypervisor and may adjust the value after operation is performed by the hypervisor but before restoring the values to the OS or any programs running on the OS. By obscuring information before providing it to a hypervisor, a CAUV may maintain security for all guest virtual machines that run with an ultravisor or other relevant elevated privilege system. By keeping track of the various system-level counters and special purpose hardware registers involved in a multiprocessing operation of applications, the CAUV may enable an OS to maintain the accuracy of low-level program counters and provide accurate quality of service.

Figure 1:
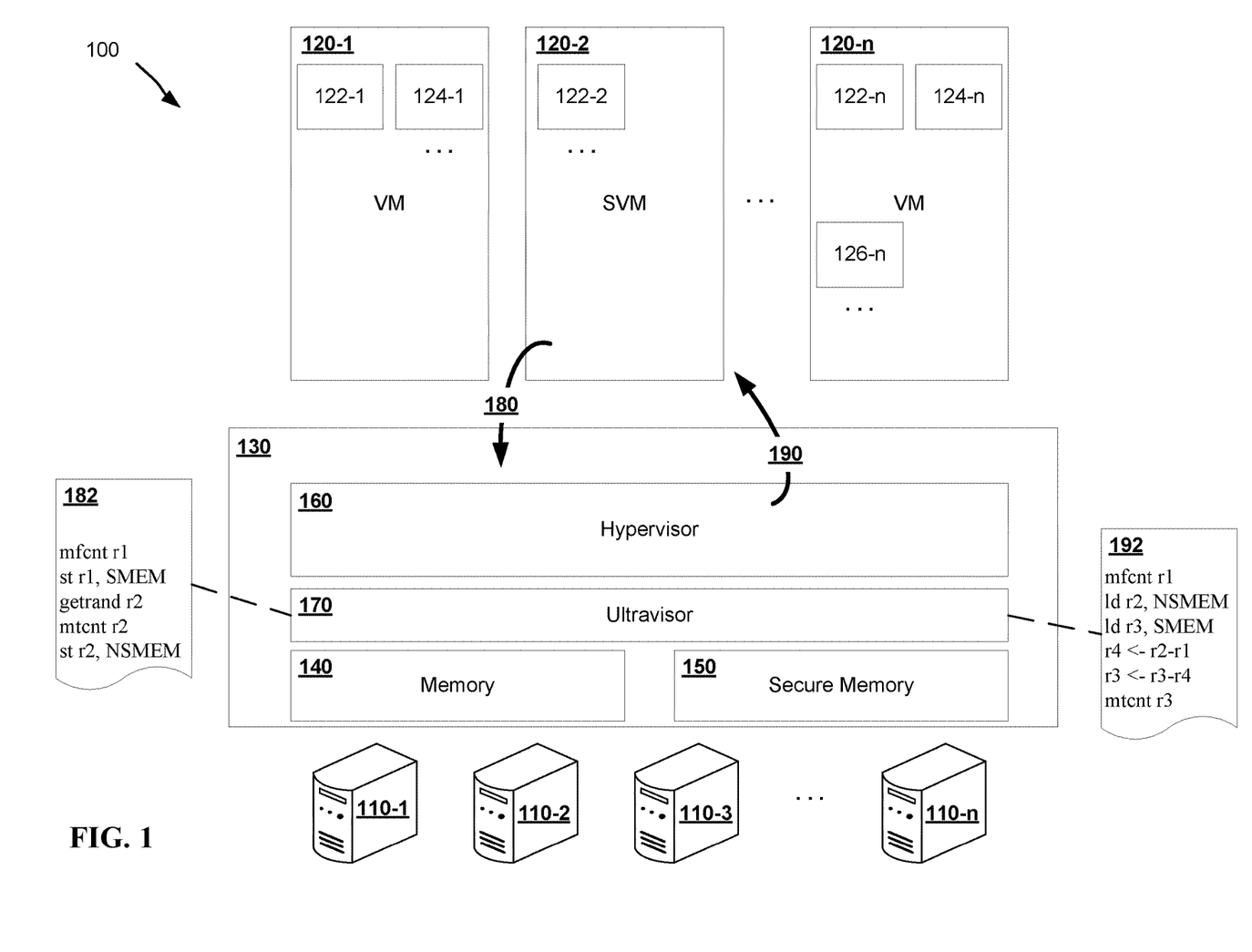
FIG. 1 depicts an example computing environment that leverages secure guest machines and time-based accuracy, consistent with some embodiments of the disclosure.
Figure 3:
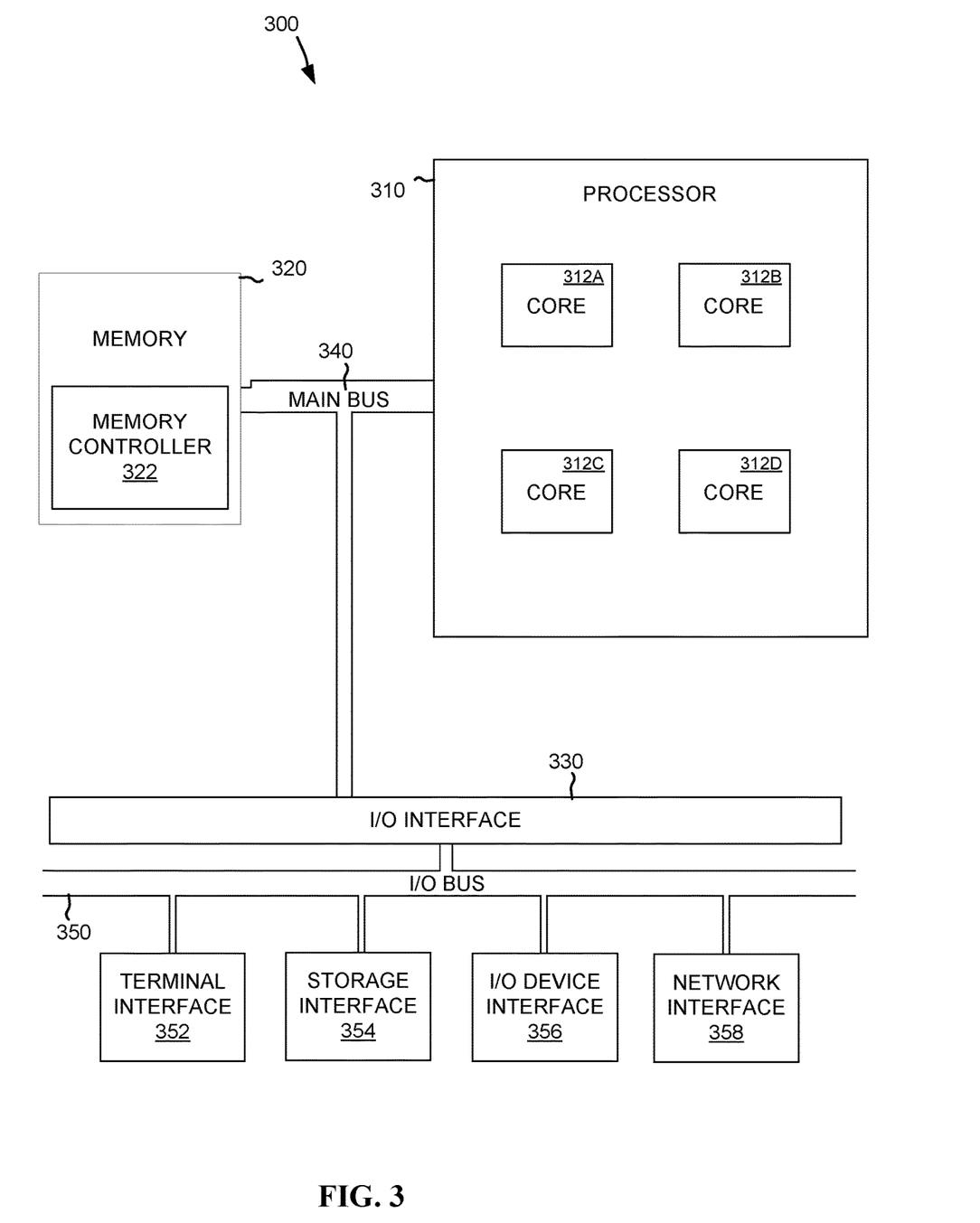
FIG. 3 depicts the representative major components of an example computer system that may be used, in accordance with some embodiments of the present disclosure.

FIG. 1 depicts an example computing environment 100 that leverages secure guest machines and time-based accuracy, consistent with some embodiments of the disclosure. Computing environment 100, may include the following: a plurality of computer systems 110-1, 110-2, 110-3 to 110-*n* (collectively, 110); one or more guest computers 120-1, 120-2 to 120-*n* (collectively, 120); and a virtualization environment 130 for hosting the guest computers 120. Computer systems 110 may include physical memory, physical processing resources, and physical I/O for facilitating and hosting the virtualization environment 130. FIG. 3 depicts an example computer system 300 capable of performing hosting consistent with some embodiments of the disclosure. The computer systems 110 may be located at a datacenter. In some embodiments, the computer systems 110 may be separated geographically. For example, computer system 110-1 may be located at a first location, and computer system 110-2 geographically disparately from computer system 110-1.

The guest computers 120 may be in the form of virtual machines and secure virtual machines. For example, guest computer 120-1 may be a virtual machine that is served hardware resources of computer system 110-1 and 110-3 from the virtualization environment 130. In another example, guest computer 120-2 may be a secure virtual machine that is server hardware resources from the virtualization environment 130. The guest computers 120 may make reference to hardware in the form of hardware requests (e.g., arithmetic logic units of a processor, memory references to cache, counters, read commands to dynamic random access memory (DRAM), and store commands to tertiary storage devices).

The virtualization environment 130 may be configured to host various computer systems, including guest computers 120. The virtualization environment 130 may be a combination of hardware, firmware, and software for hosting virtual machines and may execute on the computer systems 110. Virtualization environment 130 may be provided by a service provider that is operated by a separate entity from the guest computers 120. For example, virtualization environment 130 may be a cloud-based service provider that provides computer systems 110 to various clients. A service provider of the virtualization environment 130 may guarantee various levels of privacy and computer performance.

The virtualization environment 130 may include the following: a memory space 140 for storing program data, operating system data, and virtualized hardware registers; a secure memory space 150 for storing program data, operating system data, and virtualized hardware registers; a hypervisor 160 for serving various hardware requests of the guest computers 120; and an ultravisor for serving various hardware requests of the guest computers 120. Virtualization environment 130 may also include other components, such as a trusted platform module (TPM) (not depicted).

The virtualization environment 130 may instantiate or create guest computers 120 in response to requests from parties requesting computer resources from the cloud provider. For example, a client may request computer resources, and responsively, the hypervisor 160 may allocate guest computer 120-1 by reserving resources of the underlying computer systems and reserving a portion of memory space 140 for the execution of guest computer. The programs 122-1 and 124-1 may operate on guest computer 120-1 and all low-level registers and memory corresponding to operation of the guest computer 120-1 may be stored in the memory space 140. As program 122-1 executes and as various program counters, context switches, and other relevant multiprocessing operations are performed, the hypervisor 160 can observe the data related to these elements.

The virtualization environment 130 may also instantiate or create guest computers 120 with elevated security and privacy from the hypervisor. At manufacturing of the computer systems 110 or the firmware of the virtualization environment 130, the creation of a public and private key may be performed—for example, keys generated by the TPM of the virtualization environment 130. In some embodiments, each computer system 110 may generate a separate public and private key. The private key(s) may not be accessible by the provider of the virtualization environment 130 or by the hypervisor 160.

A virtual machine may make a request to be secured and may wrap an encryption key with the public key(s). Responsive to the request, the virtualization environment 130 may operate to secure the virtual machine from the hypervisor 160. For example, guest computer 120-2 may be created by the hypervisor 160 in response to a request from a client. Guest computer 120-2 at this point may be operating as a virtual machine in the memory space 140 allocated to it by the hypervisor 160. A client may generate a security request for sending and receiving data with the guest computer 120-2. The guest computer 120-2 may encrypt the security request with the public key(s) of the virtualization environment 130. The ultravisor 170 may receive the security request from guest computer 120-2 and, using the public key(s), may move the virtual machine to the secure memory space 150, consequently making guest computer 120-2 a secure virtual machine. Further executing of the OS and user programs (e.g., user program 122-2) may exist in the secure memory space 150, and the ultravisor 170 may operate to secure any data inputs of various hardware requests to the hypervisor 160. For example, the ultravisor 170 may intercept and obscure various data inputs of hardware requests, such that the hypervisor 160 cannot read or otherwise discern information of the data inputs.

The virtualization environment 130 may also implement a CAUV to maintain accurate counter data of the guest computers 120 that are operating as secure virtual machines. The CUAV may also protect information from the hypervisor 160. For example, a hardware request 180 may be sent from secure virtual machine 120-2 to the virtualization environment 130. The hardware request 180 may be directed towards the hypervisor 160. The ultravisor 170 may detect the hardware request 180 and may determine that the request includes a counter with a counter value (e.g., an 8-bit decrementer). The ultravisor 170 may intercept the hardware request 180 before it is sent to the hypervisor 160. The ultravisor 170 may store the counter value in the secure memory space 150, and the hypervisor may not be able to access the counter value. The ultravisor 170 may generate a scrambled or obscured version of the counter value, and may provide the scrambled counter value to the hypervisor 160, such that the hypervisor may perform the hardware request with the scrambled counter value. Depicted in FIG. 1 are a plurality of example operations 182 for performing an interception of a hardware request to scramble/obscure a counter consistent with some embodiments of the disclosure. The ultravisor 170 may store the scrambled counter value in the memory space 140.

Further, a response 190 to the hardware request 180 may be sent by the hypervisor 160. The response 190 may include an updated counter. The updated counter may be based off of the scrambled counter value, obscured by the ultravisor 170. The ultravisor 170 may intercept the response 190 and may unobscure the update counter. The ultravisor 170 may unobscure the updated counter by offsetting the counter value stored in the secure memory space 150 with the difference between the scrambled version of the counter value and the updated counter value of the hypervisor 160. The ultravisor 170 may send the unobscured updated counter in the response 190 to the virtual machine 120-2. Depicted are a plurality of example operation 192 for performing an interception of a hardware response to descramble/unobscure a counter consistent with some embodiments of the disclosure.

Figure 2:
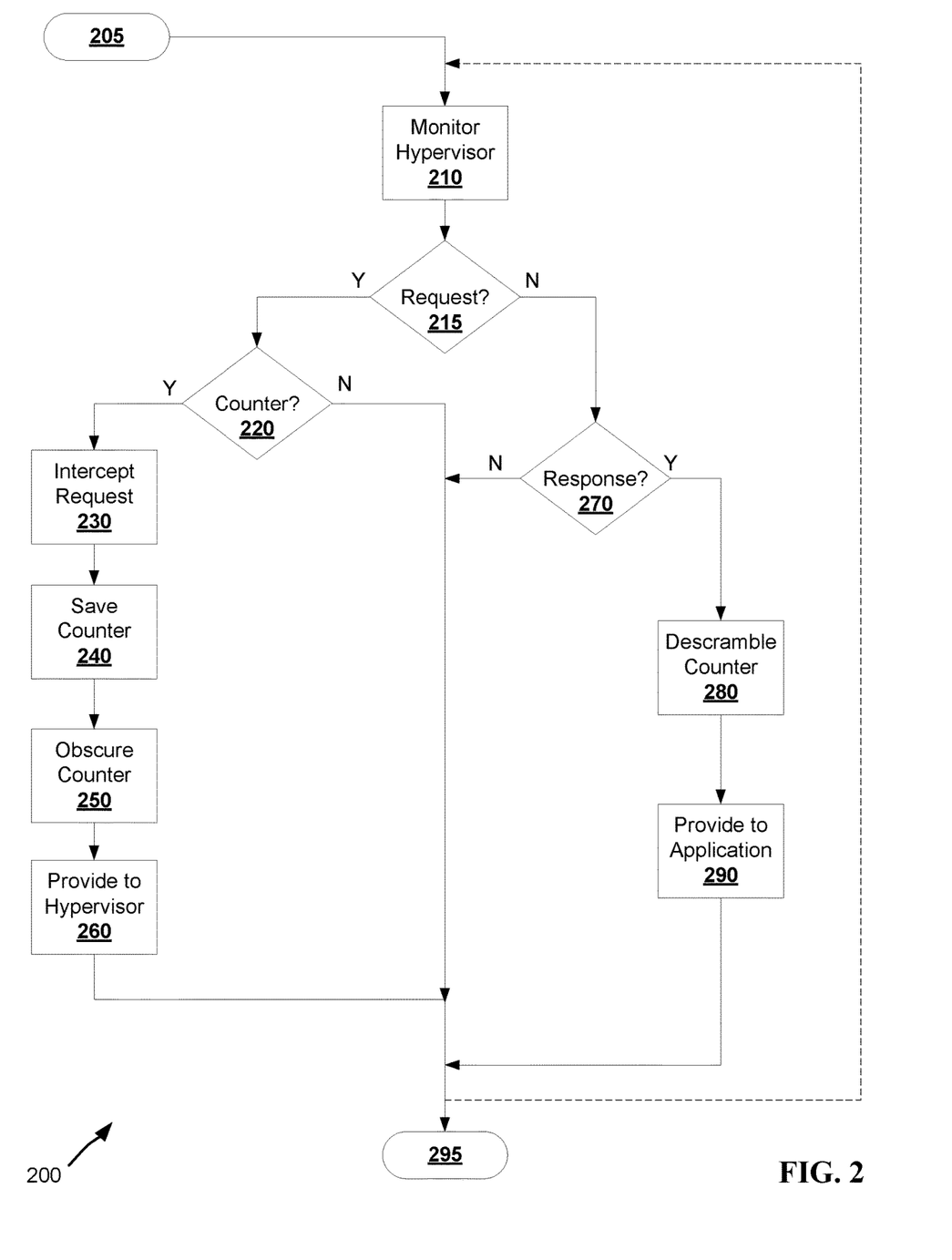
FIG. 2 depicts an example method for performing obscuring of timing registers and counter values, consistent with some embodiments of the disclosure.

FIG. 2 depicts an example method 200 for performing obscuring of timing registers and counter values, consistent with some embodiments of the disclosure. Method 200 may be performed by a computer system. Computer system 300 depicted in FIG. 3 may be configured to perform one or more parts of method 200. Method 200 may be performed by a CAUV consistent with some embodiments of the disclosure.

From start at 205, a hypervisor may be monitored at 210 for traffic between applications and a hypervisor. In some embodiments, applications may be user programs, such as an engineering simulation program, a word processing program, or a graphical rendering program. In some embodiments, applications may be an OS, such as a guest computer hosted by a virtualization system. Monitoring traffic may include monitoring for applications that are running within a secure virtual machine—for example, applications that have initiated a secure session with a CAUV that protects memory and certain operation information from inspection from a hypervisor. In some embodiments, monitoring of traffic may include obscuring, scrambling, or otherwise randomizing (such as by a random number generator) certain data inputs provided to a hypervisor. For example, if a hardware request includes a certain register value, pointer, or other data element that is not necessary for the hypervisor to perform operations for a guest computer, the ultravisor may hide, zero-out, randomize, data shift, or otherwise obscure the data element.

If a hardware request is detected, at 215: Y, it will be determined if there is a counter within the hardware request at 220. If there is not a counter (220: N), method 200 ends at 295. If there is a counter (220: Y), then the hardware request may be intercepted at 230. Intercepting the hardware request may be an active operation. For example, an ultravisor may detect that a hardware request has been placed within a queue for processing by the hypervisor. The ultravisor may intercept the hardware request before the hypervisor can see or inspect the request. The interception of hardware requests may be a reactive operation. For example, hardware requests from secure virtual machines may be encrypted such that only the ultravisor or another secure element of a virtualization environment can read the hardware request while the hypervisor cannot read the hardware request until it has been unencrypted.

A counter within the intercepted hardware request may be saved at 240. The counter may be a reference, pointer, value, or other data element of a computer system (e.g., a program counter, a decrementer, a special purpose register, a multiprocessing register, a multithreading register). The counter may include a counter value (e.g., a 3-bit value, an 8-bit value). The counter value in the intercepted request may be obscured at 250. Obscuring of the counter value may include scrambling, randomizing (e.g., by a TPM), byte shifting, zeroing-out, or otherwise inserting data unrelated to the counter value. Obscuring of the counter value may include changing the counter value such that upon inspection by a hypervisor, no meaningful information may be discerned by the hypervisor. The obscured counter value may be saved in a memory (e.g., a memory space shared with the hypervisor, or a secure memory space inaccessible by the hypervisor).

At 260 the updated hardware request may be provided to the hypervisor. Providing the updated hardware request may include providing the hardware request with the obscured counter in a decrypted form to the hypervisor. Providing the updated hardware request may include moving the hardware request with the obscured counter to a queue of the hypervisor. For example, the hypervisor may have a memory space where various requests and working memory of the hypervisor reside. Providing the updated request at 260, may include an ultravisor moving the updated request to the memory space from a secure memory not accessible by the hypervisor. After providing the updated request at 260, method 200 may end at 295. In some embodiments, method 200 may begin again at 205 and the hypervisor may continue to be monitored at 210.

If there is not a hardware request (215: N), a response to a hardware request may be identified at 270. In some embodiments, if there is a response identified (270: Y), the response may be blocked from being sent back to the application intended by the hypervisor (e.g., the application that sent the hardware request corresponding to the response). If there is a response to the hardware request by the hypervisor (270: Y), the counter may be descrambled at 280.

Descrambling of the counter may include determining the updated counter value from the hypervisor in the response. Descrambling of the counter may include generating an update amount. For example, an ultravisor may compare the updated counter value from the response to the stored obscured counter that was previously provided to the hypervisor. By comparing the values (e.g., subtracting, adding) an updated amount may be calculated. For example, if an obscured counter value is "1011", and if the updated counter value is "0010", an updated amount may be "1001." The updated amount may, consequently, be the difference between a counter value before and after being operated on by the hypervisor. The updated amount may be used to calculate an updated unobscured counter value (e.g., a counter value relevant to the counter provided by an application of a guest computer). For example, if the counter value before being obscured was "1101" and the descrambled counter has an updated amount of "1001", a calculated updated unobscured counter value would be "0100." Calculating the updated unobscured counter value may include subtracting the counter value before being obscured from the difference between the obscured counter value and the updated counter value from the hypervisor.

At 290 the updated unobscured counter value may be provided to the application that sent a hardware request with a counter. Providing the updated unobscured counter value may include inserting the value into the response. Providing the updated unobscured counter value may include encrypting the response before placing the response in an output queue for the guest computer of the application. After the updated unobscured counter value is provided, method 200 ends at 295. In some embodiments, after the updated unobscured counter value is provided, at 290, method 200 may continue to monitor the hypervisor at 210.

FIG. 3 depicts the representative major components of an example computer system 300 (alternatively, computer) that may be used, in accordance with some embodiments of the present disclosure. It is appreciated that individual components may vary in complexity, number, type, and\or configuration. The particular examples disclosed are for example purposes only and are not necessarily the only such variations. The computer system 300 may comprise a processor 310, memory 320, an input/output interface (herein I/O or I/O interface) 330, and a main bus 340. The main bus 340 may provide communication pathways for the other components of the computer system 300. In some embodiments, the main bus 340 may connect to other components such as a specialized digital signal processor (not depicted).

The processor 310 of the computer system 300 may be comprised of one or more cores 312A, 312B, 312C, 312D (collectively 312). The processor 310 may additionally include one or more memory buffers or caches (not depicted) that provide temporary storage of instructions and data for the cores 312. The cores 312 may perform instructions on input provided from the caches or from the memory 320 and output the result to caches or the memory. The cores 312 may be comprised of one or more circuits configured to perform one or more methods consistent with embodiments of the present disclosure. In some embodiments, the computer system 300 may contain multiple processors 310. In some embodiments, the computer system 300 may be a single processor 310 with a singular core 312.

The memory 320 of the computer system 300 may include a memory controller 322. In some embodiments, the memory 320 may comprise a random-access semiconductor memory, storage device, or storage medium (either volatile or non-volatile) for storing data and programs. In some embodiments, the memory may be in the form of modules (e.g., dual in-line memory modules). The memory controller 322 may communicate with the processor 310, facilitating storage and retrieval of information in the memory 320. The memory controller 322 may communicate with the I/O interface 330, facilitating storage and retrieval of input or output in the memory 320.

The I/O interface 330 may comprise an I/O bus 350, a terminal interface 352, a storage interface 354, an I/O device interface 356, and a network interface 358. The I/O interface 330 may connect the main bus 340 to the I/O bus 350. The I/O interface 330 may direct instructions and data from the processor 310 and memory 320 to the various interfaces of the I/O bus 350. The I/O interface 330 may also direct instructions and data from the various interfaces of the I/O bus 350 to the processor 310 and memory 320. The various interfaces may include the terminal interface 352, the storage interface 354, the I/O device interface 356, and the network interface 358. In some embodiments, the various interfaces may include a subset of the aforementioned interfaces (e.g., an embedded computer system in an industrial application may not include the terminal interface 352 and the storage interface 354).

Logic modules throughout the computer system 300—including but not limited to the memory 320, the processor 310, and the I/O interface 330—may communicate failures and changes to one or more components to a hypervisor or operating system (not depicted). The hypervisor or the operating system may allocate the various resources available in the computer system 300 and track the location of data in memory 320 and of processes assigned to various cores 312. In embodiments that combine or rearrange elements, aspects and capabilities of the logic modules may be combined or redistributed. These variations would be apparent to one skilled in the art.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
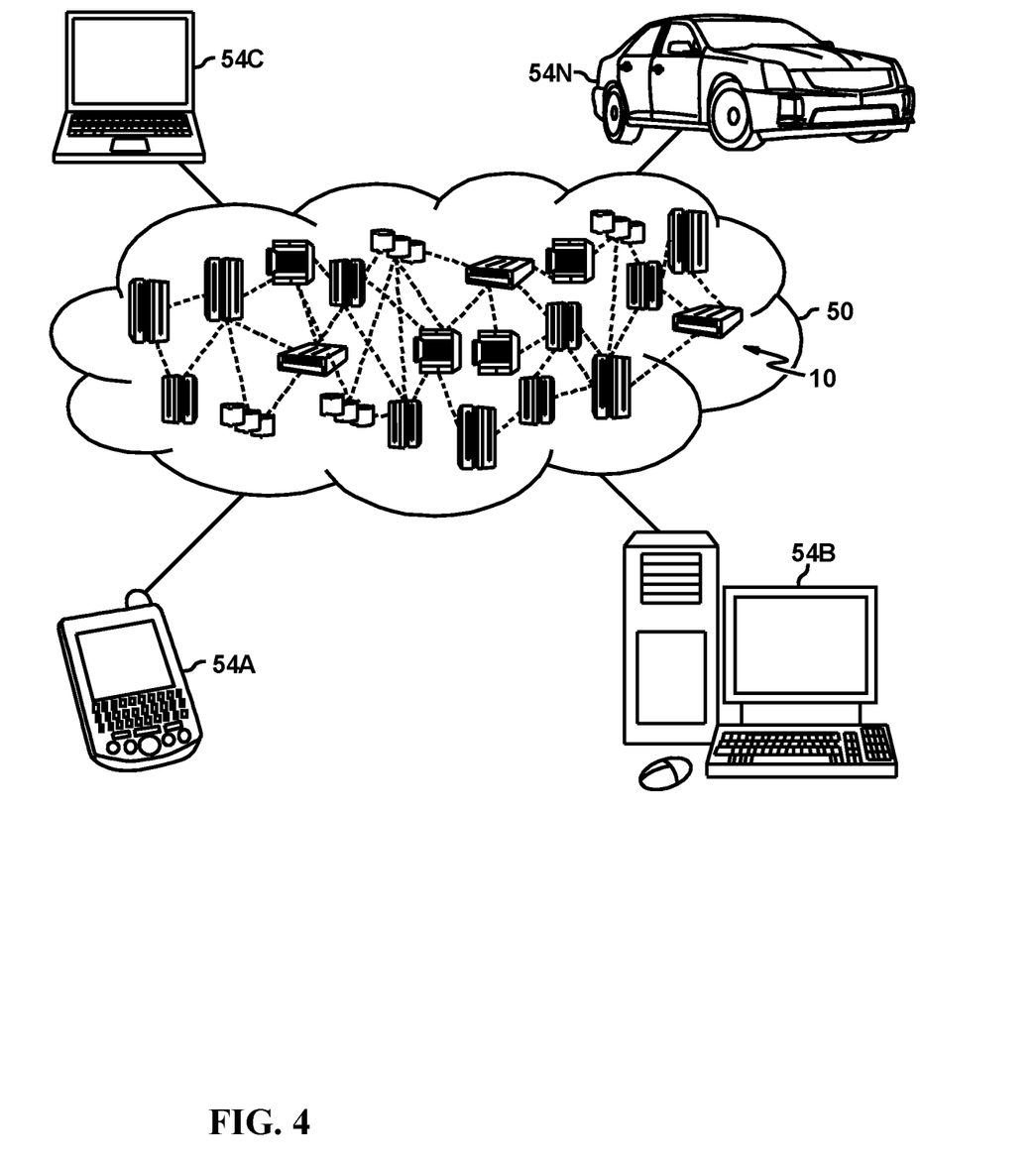
FIG. 4 depicts a cloud computing environment according to some embodiments of the present invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 5:
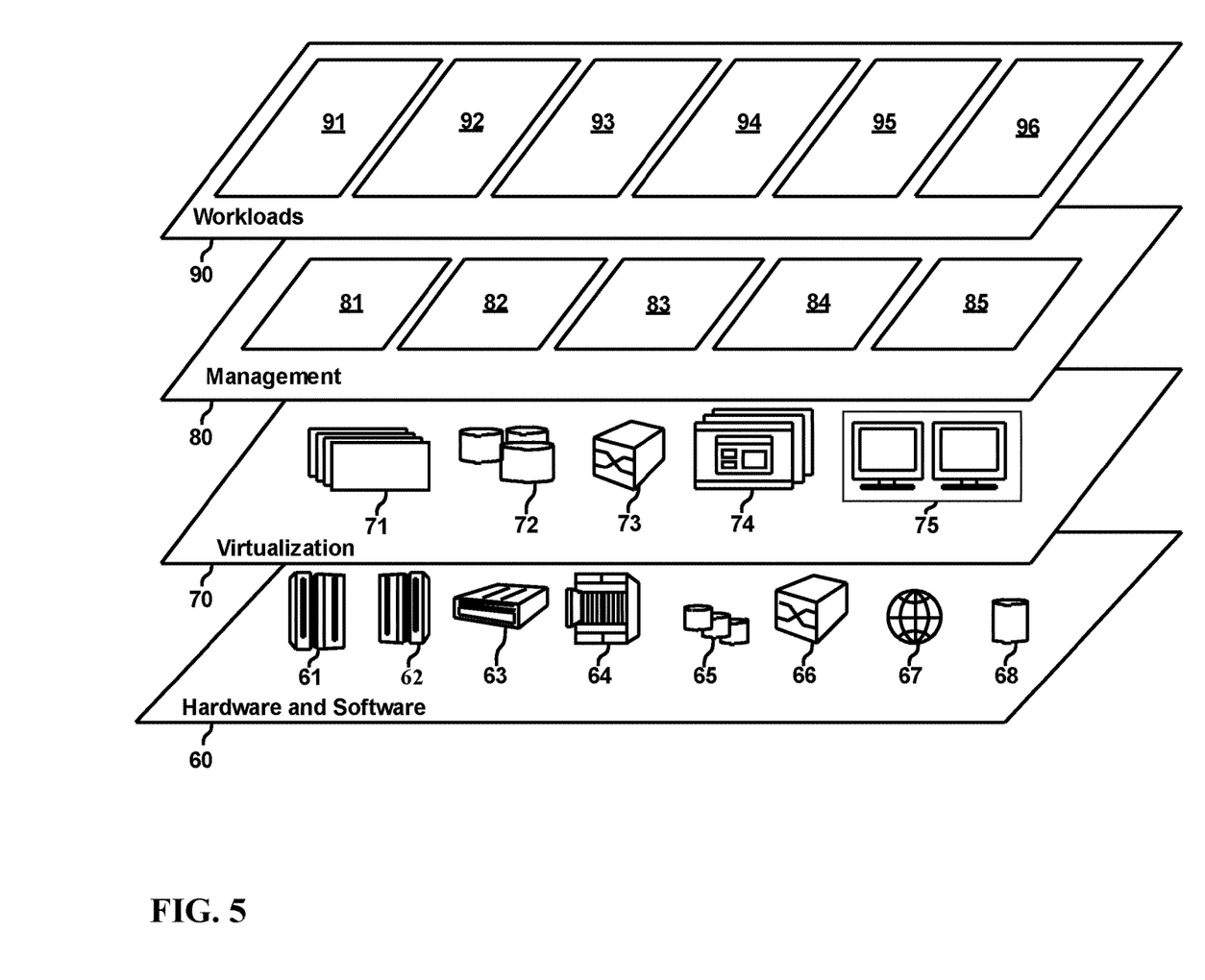
FIG. 5 depicts abstraction model layers according to some embodiments of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. Virtual applications and operating systems 74 may operate based on a CAUV consistent with some embodiments of the disclosure.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; a mobile desktop 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method comprising:
   detecting a hardware request of an application, wherein the application executes on a virtualized computer system, wherein the application is a valid application from a client that is provisioned resources of the virtualized computer system;
   determining that the hardware request includes a counter, wherein the counter is to be updated by the virtualized computer system, and wherein the counter includes a counter value;
   intercepting, based on the determining that the hardware request includes the counter, the hardware request before the hardware request is processed by a hypervisor that hosts the virtualized computer system;
   saving the counter value in a secure memory, the secure memory obscured from the hypervisor, wherein the saving occurs after the resources of the virtualized computer system have been provisioned and provided to the client;
   generating a scrambled counter value;
   updating the hardware request with the scrambled counter value;
   providing the updated hardware request to the hypervisor;
   detecting a response to the updated hardware request from the hypervisor, wherein the response includes an updated scrambled counter value;
   intercepting the detected response; and
   generating, based on the scrambled counter value and the updated scrambled counter value, an update amount.

2. The method of claim 1, further comprising:
   determining, based on the detecting of the hardware request, one or more data inputs in the hardware request; and
   obscuring the one or more data inputs.

3. The method of claim 1, wherein the secure memory is encrypted, and wherein the hypervisor does not have access to the secure memory.

4. The method of claim 1, wherein the method is performed by an ultravisor.

5. The method of claim 4, wherein the scrambled counter value is generated by a random number generator of the ultravisor.

6. The method of claim 1, further comprising:
   calculating, based on the counter value and based on the update amount, an updated counter value; and
   providing the updated counter value to the application.

7. The method of claim 1, wherein the counter is a decrementer.

8. A system, the system comprising:
   a memory, the memory containing one or more instructions; and
   a processor, the processor communicatively coupled to the memory, the processor, in response to reading the one or more instructions, configured to:
   detect a hardware request of an application, wherein the application executes on a virtualized computer system, wherein the application is a valid application from a client that is provisioned resources of the virtualized computer system;
   determine that the hardware request includes a counter, wherein the counter is to be performed by the virtualized computer system, and wherein the counter includes a counter value;
   intercept, in response to the determining that the hardware request includes the counter, the hardware request before the hardware request is processed by a hypervisor that hosts the virtualized computer system;
   save the counter value in a secure memory, the secure memory obscured from the hypervisor, wherein the save occurs after the resources of the virtualized computer system have been provisioned and provided to the client;
   generate a scrambled counter value;
   update the hardware request with the scrambled counter value;
   provide the updated hardware request to the hypervisor;
   detect a response to the updated hardware request from the hypervisor, wherein the response includes an updated scrambled counter value;
   intercept the detected response; and
   generate, based on the scrambled counter value and the updated scrambled counter value, an update amount.

9. The system of claim 8, wherein the processor is further configured to:
   determine, based on the detecting the hardware request, one or more data inputs in the hardware request; and
   obscure the one or more data inputs.

10. The system of claim 8, wherein the secure memory is encrypted, and wherein the hypervisor does not have access to the secure memory.

11. The system of claim 8, wherein the processor is configured to execute an ultravisor.

12. The system of claim 11, wherein the generate the scrambled counter value includes obtaining the scrambled counter value from a trusted platform module in communication with the ultravisor.

13. The system of claim 8 further comprising:
   calculate, based on the counter value and based on the update amount, an updated counter value; and
   provide the updated counter value to the application.

14. The system of claim 8, wherein the counter is a decrementer.

15. A computer program product, the computer program product comprising a computer readable storage medium having program instructions embodied therewith, the program instructions configured to:
   detect a hardware request of an application, wherein the application executes on a virtualized computer system, wherein the application is a valid application from a client that is provisioned resources of the virtualized computer system;
   determine that the hardware request includes a counter, wherein the counter is to be performed by the virtualized computer system, and wherein the counter includes a counter value;
   intercept, in response to the determining that the hardware request includes the counter, the hardware request before the hardware request is processed by a hypervisor that hosts the virtualized computer system;
   save the counter value in a secure memory, the secure memory obscured from the hypervisor, wherein the save occurs after the resources of the virtualized computer system have been provisioned and provided to the client;
   generate a scrambled counter value;
   update the hardware request with the scrambled counter value; and
   provide the updated hardware request to the hypervisor;
   detect a response to the updated hardware request from the hypervisor, wherein the response includes an updated scrambled counter value;
   intercept the detected response; and
   generate, based on the scrambled counter value and the updated scrambled counter value, an update amount.

16. The computer program product of claim 15, wherein the program instructions further configured to:
   determine, based on the detecting the hardware request, one or more data inputs in the hardware request; and
   obscure the one or more data inputs.

17. The computer program product of claim 15, wherein the secure memory is encrypted, and wherein the hypervisor does not have access to the secure memory.

18. The computer program product of claim 15, wherein the scrambled counter value is generated by a random number generator of an ultravisor.

19. The computer program product of claim 15, wherein the program instructions further configured to:
   calculate, based on the counter value and based on the update amount, an updated counter value; and
   provide the updated counter value to the application.

20. The computer program product of claim 15, wherein the counter is a decrementer.

* * * * *